US012781063B2

(12) United States Patent

Huang

(10) Patent No.: US 12,781,063 B2

(45) Date of Patent: Nov. 3, 2026

(54) CONDUCTIVE HYDROLYSABLE MATERIALS AND APPLICATIONS THEREOF

(71) Applicant: CealTech AS, Stavanger (NO)

(72) Inventor: Fan Huang, Stavanger (NO)

(73) Assignee: CEALTECH AS, Stavanger (NO)

( * ) Notice: Subject to any disclaimer, the term of this patent is extended or adjusted under 35 U.S.C. 154(b) by 538 days.

(21) Appl. No.: 18/263,253

(22) PCT Filed: Feb. 2, 2022

(86) PCT No.: PCT/EP2022/052409

§ 371 (c)(1),
(2) Date: Jul. 27, 2023

(87) PCT Pub. No.: WO2022/167452

PCT Pub. Date: Aug. 11, 2022

(65) Prior Publication Data

US 2024/0117197 A1 Apr. 11, 2024

(30) Foreign Application Priority Data

Feb. 2, 2021 (SE) .................................... 2150119-2
Mar. 10, 2021 (SE) .................................... 2150276-0
Jul. 1, 2021 (SE) .................................... 2150864-3

(51) Int. Cl.

*C09D 5/16* (2006.01)
*B05D 5/12* (2006.01)
*C08K 3/04* (2006.01)
*C09D 5/24* (2006.01)
*C09D 7/61* (2018.01)

(52) U.S. Cl.

CPC ............... *C09D 5/165* (2013.01); *B05D 5/12* (2013.01); *C08K 3/041* (2017.05); *C08K 3/042* (2017.05); *C09D 5/24* (2013.01); *C09D 7/61* (2018.01); *B05D 2502/00* (2013.01); *B05D 2503/00* (2013.01); *B05D 2505/00* (2013.01); *B05D 2508/00* (2013.01); *B05D 2601/20* (2013.01)

(58) Field of Classification Search

CPC . C09D 5/165; C09D 5/24; C09D 7/61; C09D 143/04; C08K 3/04; C08K 3/041; C08K 3/042; C08K 3/08; B05D 5/12; B05D 2502/00; B05D 2503/00; B05D 2505/00; B05D 2505/2508; B05D 2601/20

See application file for complete search history.

(56) References Cited

U.S. PATENT DOCUMENTS 6,458,878 B1 10/2002 Tsuboi et al.
6,558,746 B2 5/2003 Starz et al.
2015/0122146 A1* 5/2015 Gruner ................. C09D 5/1618 427/383.1
2015/0125687 A1 5/2015 Gabriel
2017/0352886 A1 12/2017 Matsuzaki et al.
2019/0338146 A1* 11/2019 Meng ................... C08G 18/348

FOREIGN PATENT DOCUMENTS

EP 1208167 B1 7/2003

OTHER PUBLICATIONS

"International Preliminary Report on Patentability corresponding to International Application No. PCT/EP2022/052409 mailed May 10, 2023".

"International Search Report and Written Opinion corresponding to International Application No. PCT/EP2022/052409 mailed May 17, 2022".

Pilch-Pitera, Barbara , et al., "Conductive polyurethane-based powder clear coatings modified with carbon nanotubes", Process in Organic Coatings 137:105367 (Oct. 5, 2019) 6 pages.

Staudinger, U , et al., "Properties of thin layers of electrically conductive polymer/MWCNT composites prepared by spray coating", Composites Science and Technology 138:134-143 (Nov. 17, 2016).

* cited by examiner

*Primary Examiner* — William P Fletcher, III

(74) *Attorney, Agent, or Firm* — Myers Bigel, P.A.

(57) ABSTRACT

The build-up of scale on a conductive surface in contact with an aqueous environment is prevented and/or eliminated by coating said surface with a self-polishing or ablative coating system comprising one or more layers, wherein the outermost layer comprises a hydrolysable polymer with conductive elements embedded in said polymer, and wherein said conductive elements comprise conductive particles chosen from carbon-based materials such as graphene particles, carbon nanotubes, carbon black, graphite, activated carbon and metal particles, and combinations thereof, said conductive particles having an average particle size in the interval from 1 nm to 500 μm. Coatings, elements, such as electrodes, and compositions are also disclosed.

24 Claims, 5 Drawing Sheets

CONDUCTIVE HYDROLYSABLE MATERIALS AND APPLICATIONS THEREOF

STATEMENT OF PRIORITY

This application is a 35 U.S.C. § 371 national phase application of PCT Application No. PCT/EP2022/052409 filed Feb. 2, 2022, which claims priority to Swedish Application No. 2150117-6, filed Feb. 2, 2021, Swedish Application No. 2150276-0, filed Mar. 10, 2021, and Swedish Application No. 2150864-3, filed Jul. 1, 2021, the entire contents of each of which are incorporated by reference herein.

TECHNICAL FIELD

The present disclosure relates to the field of surface-active or surface-modified materials, surface treatment and coatings intended for surfaces prone to the build-up of scale and in particular to methods and compositions for preventing or eliminating the build-up of scale on surfaces subjected to aqueous environments, such as but not limited to conductive elements and electric contact surfaces for use in aqueous environments, for example elements such as electrodes for use in the electrolysis of aqueous solutions.

BACKGROUND

With the exception of distilled or ultrapure water, all aqueous solutions comprise inorganic and organic substances. These can be seen as resources and raw materials to be extracted from the solution, but when such substances are unwanted for one reason or another, they are referred to as impurities. Depending on which chemical species are present in the aqueous solution, and what treatment the solution is subjected to, the composition of an aqueous solution can be more or less problematic. Seawater, wastewater, and aqueous process streams in industry and agriculture are examples of complex aqueous solutions, containing multiple chemical species.

When handling aqueous solutions, poorly soluble substances tend to precipitate or accumulate on surfaces, a phenomenon also referred to as scaling or the build-up of scale. This is frequently encountered during the electrolysis of water, which theoretically would produce only oxygen and hydrogen gas. In practice, what is referred to simply as "water" however frequently contains various dissolved salts and minerals and should more correctly be referred to as an aqueous solution. When for example dissolved calcium ($Ca^{2+}$) and magnesium ($Mg^{2+}$) react with negative ions such as OH-which is a product of hydrolysis of water, they form solid materials such as $Ca(OH)_2$ and $Mg(OH)_2$. Other ions that can contribute to the formation of scale are for example $Al^{3+}$, $CO_3^{2-}$, $SO_4^-$ etc. Such scale is not conductive. As scale accumulates on an electrode, the electrolysis will become less efficient or even stop.

A related problem is that of oxidation of surfaces exposed to aqueous solutions and to humidity. This takes the form of corrosion, an irreversible damage to surfaces and structures. Practically all materials are prone to oxidation, but electrically conductive materials such as most metals, are particularly susceptible to electrochemical oxidation in reaction with an oxidant such as oxygen. This is generally referred to as corrosion, or in the case of elemental iron and its alloys, such as steel, this is familiarly referred to as rusting. The problem of corrosion and rusting is accentuated in aqueous environments and in particular aqueous environments where there are free ionic species, e.g. salts, which facilitate the transport of free electrons.

Corrosion is accelerated when performing electrolysis, as the application of voltage to electrodes placed in an aqueous solution accelerates the transport of electrons, and results in the reduction of chemical species at the cathode (the negative electrode) and oxidation of other chemical species at the anode (the positive electrode). The anode will be subject to corrosion, due to the oxidative environment. The corrosion includes chemical corrosion caused by a reaction with oxygen and electrochemical corrosion caused by a reaction with salt ions as well as by the electrochemical potential between the working electrode and the counter electrode when a current is flowing through the electrolyte.

Scaling and corrosion can also reciprocate, as the formation of scale creates an environment where both moisture and reactive chemicals, mainly salts, are attached to the surface of materials used in building elements, process equipment and components, such as electrodes, operated in aqueous environments.

There are serious problems of scaling and corrosion in many applications, such as the handling of hard water in various applications, purification of potable water in water treatment plants, the treatment of process waters in industry and agriculture, wastewater and sewage treatment, only to mention a few examples.

Scaling and corrosion can also occur as a result of galvanic corrosion, i.e. a situation where two dissimilar metals are in contact through an electrolyte. One example is the corrosion of metal objects and structures exposed to water/humidity.

There are many approaches to counteract corrosion and scaling, but these phenomena remain considerable problems in many different fields, electrolysis and marine constructions being only two examples. Thus, there remains a need for new, alternative, and more efficient solutions.

Biofouling, the build-up of a biofilm, i.e. organic substances, on the surface, may appear related but is actually a separate, distinct problem. Unlike scaling, the build-up of inorganic substances, biofouling can be addressed by adding biocides or toxins to paints and coatings. Another approach is to make the surface hydrophobic (water repellent). Polymers belonging to the polysiloxane family can be used for this purpose. There are also examples of antifouling coatings which contain hydrolysable material embedded in a polymer matrix, resulting in that the surface of the coating slowly degrades, removing the biofilm. This approach is frequently combined with the inclusion of biocides, which are gradually exposed as the coating degrades. The issue of biofouling and methods for preventing or reducing it should however not be confused with scaling and approaches for addressing scaling.

SUMMARY

One objective is to reduce or preferably eliminate scaling/the build-up of scale on conductive surfaces which are in contact with an aqueous environment. Another objective is to eliminate scaling and maintain performance of an electrode operated in an aqueous environment. Further objectives and the associated solutions and their advantages will appear from the following description, examples, and claims.

According to a first aspect, the present disclosure makes available a method for preventing and/or eliminating build-up of scale on a conductive surface in contact with an aqueous environment, wherein said surface is coated with a self-polishing or ablative coating system comprising one or more layers, wherein at least the outermost layer comprises a hydrolysable polymer with conductive elements embedded in said polymer, and wherein said conductive elements comprise conductive particles chosen from carbon-based materials such as graphene particles, carbon nanotubes, carbon black, graphite, activated carbon and metal particles, and combinations thereof, said conductive particles having an average particle size in the interval from 1 nm to 500 μm.

According to an embodiment of the above, at least two layers are present, and each layer is made conductive by embedded conductive elements.

According to another embodiment, freely combinable with the above, said conductive elements comprise a mixture of graphene particles and carbon nanotubes.

According to another embodiment, freely combinable with the above, said conductive elements are formed from conductive polymers such as but not limited to polythiophene, polyaniline, and polypyrrol, mixed with the hydrolysable polymer.

According to another embodiment, freely combinable with the above, the hydrolysable polymer is chosen from polyacrylates, polyesters, polyethers, polyamides, polyanhydrides, polyurethanes, polycarbonates, and polyureas.

According to another embodiment, freely combinable with the above, the ratio of conductive elements to the hydrolysable polymer is in the interval of 0.1% to 80% (w/w) of the total dry material of the coating system.

A second aspect of the present disclosure relates to a self-polishing or ablative coating comprising one or more layers, wherein at least the outermost layer comprises a hydrolysable polymer with conductive elements embedded in said polymer, wherein said conductive elements are conductive particles chosen from carbon-based materials such as graphene particles, carbon nanotubes, carbon black, graphite, activated carbon, and metal particles, said conductive particles having an average particle size in the interval from 1 nm to 500 μm.

According to an embodiment of the second aspect, at least two layers are present in said coating and each layer comprises embedded conductive elements.

According to another embodiment, said conductive elements comprise a mixture of graphene particles and carbon nanotubes.

According to an embodiment, said conductive elements are formed from conductive polymers such as but not limited to polythiophene, polyaniline, and polypyrrole, mixed or bonded with the hydrolysable polymer.

According to an embodiment, freely combinable with the above, the hydrolysable polymer is chosen from polyacrylates, polyesters, polyethers, polyamides, polyanhydrides, polyurethanes, polycarbonates, and polyureas.

According to another embodiment, freely combinable with the above, the ratio of conductive elements to the hydrolysable polymer is in the interval of 0.1% to 80% (w/w) of the total dry material of the coating system.

According to an embodiment, freely combinable with the above, the coating further comprises a primer applied on a conductive surface to be coated, improving adherence between said surface and the following coating or coatings.

According to an embodiment, freely combinable with the above, the coating further comprises a tiecoat between the topcoat and the substrate or between the topcoat and a primer applied to said substrate.

A third aspect relates to an element having a conductive surface capable of reducing or eliminating the formation of scale on said surface when said element is used in an aqueous environment, wherein said surface comprises a hydrolysable polymer with conductive elements embedded in said polymer, wherein said conductive elements are conductive particles chosen from carbon-based materials such as graphene particles, carbon nanotubes, carbon black, graphite, activated carbon, and metal particles, said conductive particles having an average particle size in the interval from 1 nm to 500 μm.

According to an embodiment of said third aspect, said element comprises a non-conductive core.

According to an embodiment thereof, said element consists substantially of a hydrolysable polymer with conductive elements embedded in said polymer.

According to an embodiment freely combinable with the above, said element is an electrode.

A fourth aspect relates to an electrode coated with a self-polishing or ablative coating system comprising one or more layers, wherein said/each layer comprises conductive elements and wherein the outermost layer comprises a hydrolysable polymer with conductive elements embedded in said polymer.

According to an embodiment of said fourth aspect, said electrode comprises a conductive substrate such as a metallic material or graphite core which is coated with said self-polishing or ablative conductive coating system.

According to another embodiment of said fourth aspect, said electrode comprises a non-conductive substrate which is coated with said self-polishing or ablative conductive coating system, wherein said a non-conductive substrate is chosen from a material such as plastic, glass, or quartz.

According to an embodiment of said fourth aspect, said electrode consists substantially of a hydrolysable polymer with conductive elements embedded in said polymer.

It is understood that the above aspects and embodiments are freely combinable where not explicitly otherwise stated, and that further aspects and embodiment may be evident to a person skilled in the art following a study of the detailed description, claims and drawings.

BRIEF DESCRIPTION OF THE DRAWINGS

Aspects and embodiments are now described, by way of example, with reference to the accompanying drawings, in which.

Figure 1:
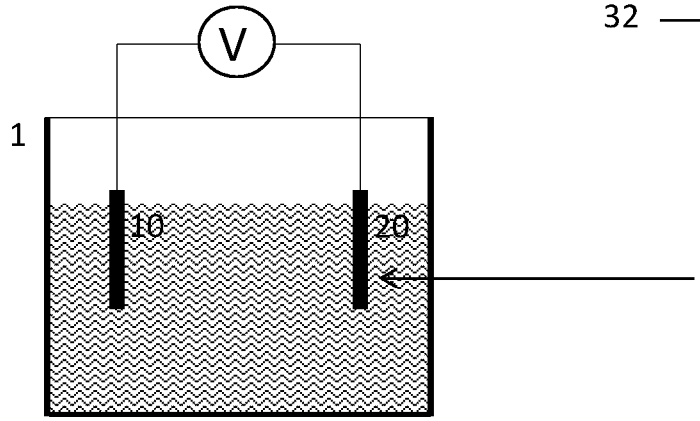
FIG. 1 schematically shows an electrolytic cell (1) including a voltage source (V) and two electrodes (10, 20) connected to said voltage source, and immersed in an aqueous solution.

A skilled person will understand that figures are schematic and simplified, and that various features are not necessarily drawn to scale or correct relative size. In particular, the thickness of the coating has been highly exaggerated compared to the size and thickness of the rest of the coated element.

DETAILED DESCRIPTION

The aspects of the present disclosure will now be described more fully hereinafter with reference to the accompanying drawings, in which certain embodiments of the invention are schematically shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

The term "material susceptible to scaling and/or corrosion" refers to any material but conductive materials such as metals and metal alloys are primarily intended. A metal or graphite electrode is one example of such materials. Electrodes coated as herein disclosed or composed entirely or substantially of one or more hydrolysable conductive materials, can be used in different fields of electrolysis of aqueous solutions, such as but not limited to the generation of $H_2$. In the generation of $H_2$, the hydrogen gas is produced on the anode, while the cathode is susceptible to scaling. The conductive hydrolysable coating can however be applied to both anode and cathode and will then protect the anode material from corrosion while simultaneously preventing scaling on the cathode.

Other examples are construction elements for maritime construction, including on-shore, off-shore and subsea applications, equipment and materials used in chemical industry, including the food and beverage industry, agriculture, environmental technologies, such as water purification, and handing/treatment of wastewater and sewage, including both industrial and municipal waste streams. Elements, such as electrodes according to the present disclosure can find utility in any application where scaling and/or corrosion is a problem, and where a conductive surface is desired for the functioning of the element or device the element forms a part of.

The term "aqueous environment" encompasses all aqueous solutions, such as water, e.g. fresh (drinking) water, process waters, wastewater, sewage, etc., but also very humid environments, such as the mist or spray of an aqueous solution.

The term "electrode" refers to a conductive element through which electricity enters or leaves an object, substance, or region, for example an electrode in an electrolytic cell, and includes electrodes of any size or shape, as well as electrodes regardless of intended use, as long as the use will make the electrodes susceptible to scaling and/or corrosion.

The term "coating system" refers to a coating consisting of one, two, three or more layers, wherein the outermost layer or so called "topcoat" comprises a hydrolysable polymer and conductive particles. A "coating system" can comprise a primer and a topcoat, and optionally a tiecoat between said primer and topcoat. Said layers can be applied as a paint, i.e. sprayed, rolled, curtain coated or painted onto the electrode or material susceptible to corrosion, or in the alternative, said electrode or material can be dipped in a liquid or thixotropic mixture forming a layer.

The term "hydrolysable" in the context of "hydrolysable polymer" means that said polymer will undergo controlled degradation through hydrolysis when in contact with water or an aqueous environment, i.e. that water molecules will break one or more chemical bonds in said polymer, and as a result, the polymer layer will gradually degrade in a controlled fashion, exposing a fresh surface and conductive particles embedded in the polymer. This phenomenon is also referred to as self-polishing, ablation and sometimes also called sloughing, and it will be accelerated if there is a relative movement between the material susceptible to corrosion and/or scaling, and the surrounding aqueous solution. In an electrolytic cell, this can be achieved by stirring or pumping to bring the aqueous solution to circulate or move relative to the electrodes. It is noted that while many polymers are to some extent hydrolysable, their rate of hydrolysis is very slow, irregular or otherwise unsuitable for use according to the herein described inventions.

Further, regarding the term "hydrolysable" it should be considered that environmental factors, such as but not limited to temperature and pH will influence the rate of hydrolysis. For example temperature will have a significant impact on the rate of hydrolysis. The higher the temperature is, the faster hydrolysis. This also opens an opportunity for controlling the rate of hydrolysis depending on intended use. When a coating according to the present invention or embodiments thereof is intended for use in a high-temperature environment, the polymer/polymer mixture is chosen such that the effect of temperature is balanced by the properties of the polymer. For example, by making the polymer less hydrophilic, the rate of hydrolysis will be slower. Similarly, the pH and for example the presence of ions catalysing the hydrolysis can be compensated for by choosing a polymer less susceptible to hydrolysation.

Finally, when discussing the nature of the polymers suitable for use herein, it should be kept in mind that the polymer can be a homopolymer, with one repeating unit, or a co-polymer, with more than one repeating unit forming the polymer chain. Polymers are a very comprehensive category of chemicals, and also include branched and grafted polymers, where side chains are attached to the main chain.

The terms "scale, scaling and the build-up of scale" are used to refer to the deposit of poorly soluble, mainly inorganic compounds on various equipment, such as pipes, steam generators, tanks, marine constructions, ships hulls, and electrodes in contact with water/aqueous solution. Examples of compounds involved in the build-up of scale include for example calcium hydroxide, calcium carbonate, magnesium hydroxide, and calcium sulphate, depending on the mineral content of the water/aqueous solution in question.

The term, "fouling" may appear confusingly related, but refers to the build-up of organic material and thus concerns a phenomenon significantly different from scaling, the build-up of inorganic precipitates. In a complex environment it is possible that both scaling and fouling takes place simultaneously or sequentially. The present disclosure however focuses on the issue of scaling, and as a bonus effect, it will efficiently prevent fouling.

The terms "self-polishing" or "ablative" refers to a coating that wears off and exposes a fresh surface at a controlled rate. This is also known as a "sloughing" coating. In the present disclosure, the self-polishing effect is achieved by the breakdown of the hydrolysable polymer.

According to a first aspect, the present disclosure makes available a method for preventing and/or eliminating build-up of scale on a conductive surface in contact with an aqueous environment, wherein said surface is coated with a self-polishing or ablative coating system comprising one or more layers, wherein the outermost layer comprises a hydrolysable polymer with conductive elements embedded in said polymer, and wherein said conductive elements comprise conductive particles chosen from carbon-based materials such as graphene particles, carbon nanotubes, carbon black, graphite, activated carbon and metal particles, and combinations thereof, said conductive particles having an average particle size in the interval from 1 nm to 500 μm.

According to an embodiment of the above, at least two layers are present and each layer is made conductive by embedded conductive elements.

According to an embodiment, the conductive particles can be shaped as nanotubes, flakes, filaments, spheres, or agglomerates of such shapes.

Preferably said conductive particles are carbon-based materials including carbon black, graphite, carbon nanotubes and graphene with an average particle size in the interval from 50 nm to 50 μm.

According to another embodiment, freely combinable with the above, said conductive elements comprise a mixture of graphene particles and carbon nanotubes. The ratio of carbon nanotubes to graphene is dependent on the property of the carbon nanotubes to graphene from different sources as well as the properties of the polymer matrix they are mixed into to achieve optimal properties, mainly conductivity and strength of the resulting material. In some embodiments, the ratio of carbon nanotubes to graphene is chosen from 1:4 to 4:1, for example 1:3 to 3:1, or for example 1:1.

According to an embodiment, said metal particles are chosen from Zn, Fe, Al, Ni, Cu, and Ag particles, or alloys thereof.

According to another embodiment, freely combinable with the above, said conductive elements are formed from conductive polymers such as but not limited to polythiophene, polyaniline, and polypyrrol, mixed with the hydrolysable polymer.

According to yet another embodiment, also freely combinable with the above, said conductive elements are composite particles, having a core consisting of one material and a coating consisting of another, different material. Such composite particles include but are not limited to graphene coated metal or non-metal particles, or combinations of one or more conductive polymers and optionally other materials.

According to another embodiment, freely combinable with the above, the hydrolysable polymer is chosen from polyacrylates, polyesters, polyethers, polyamides, polyanhydrides, polyurethanes, polycarbonates, and polyureas.

According to another embodiment, freely combinable with the above, the ratio of conductive elements to the hydrolysable polymer is in the interval of 0.1% to 80% (w/w) of the total dry material of the coating system, for example 0.1-10% (w/w), 1-10% (w/w), 0.1-1% (w/w), 1-5% (W/w), 10-20% (W/W), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w).

According to one embodiment, the hydrolysable polymer is selected among polymers having hydrolysable side groups attached to a polymer backbone.

Alternatively, according to an embodiment, the chosen polymer has a non-degradable backbone but degradable (hydrolysable) side groups. Examples include poly(silyl acrylate) with a degradable backbone. The hydrolysable polymer can also be selected among polymers having hydrolysable units included in their polymer backbone.

When preparing the composition of the coating, including the choice of hydrolysable polymer, selections are made such that the coating maintains a substantially constant conductivity during its desired lifespan, with consideration of the operating conditions, such as but not limited to temperature and pH.

A second aspect of the present disclosure relates to a self-polishing or ablative conductive coating comprising one or more layers, wherein at least the outermost layer comprises a hydrolysable polymer with conductive elements embedded in said polymer, wherein said conductive elements are conductive particles chosen from carbon-based materials such as graphene particles, carbon nanotubes, carbon black, graphite, activated carbon, and metal particles, said conductive particles having an average particle size in the interval from 1 nm to 500 μm.

According to an embodiment of the second aspect, at least two layers are present, and each layer comprises embedded conductive elements.

According to another embodiment of said second aspect, said conductive elements comprise a mixture of graphene particles and carbon nanotubes. As explained above, the ratio of carbon nanotubes to graphene is dependent on the property of the carbon nanotubes to graphene from different sources as well as the properties of the polymer matrix they are mixed into to achieve optimal properties, mainly conductivity and strength of the resulting material. In some embodiments, the ratio of carbon nanotubes to graphene is chosen from 1:4 to 4:1, for example 1:3 to 3:1, or for example 1:1.

According to an embodiment of said second aspect, said metal particles are chosen from Zn, Fe, Al, Ni, Cu, and Ag particles, or alloys thereof.

According to an embodiment, said conductive elements are formed from conductive polymers such as but not limited to polythiophene, polyaniline, and polypyrrol, mixed or bonded with the hydrolysable polymer.

According to an embodiment, freely combinable with the above, the hydrolysable polymer is chosen from polyacrylates, polyesters, polyethers, polyamides, polyanhydrides, polyurethanes, polycarbonates, and polyureas.

According to yet another embodiment of said second aspect, also freely combinable with the above aspects and embodiments, said conductive elements are composite particles, having a core consisting of one material and a coating consisting of another, different material. Such composite particles include but are not limited to graphene coated metal or non-metal particles, or combinations of one or more conductive polymers and optionally other materials.

According to another embodiment, freely combinable with the above, the ratio of conductive elements to the hydrolysable polymer is in the interval of 0.1% to 80% (w/w) of the total dry material of the coating system, for example 0.1-10% (w/w), 1-10% (w/w), 0.1-1% (w/w), 1-5% (W/w), 10-20% (W/W), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w).

According to an embodiment, freely combinable with the above, the coating further comprises a primer applied on a conductive surface to be coated, improving adherence between said surface and the following coating or coatings.

According to an embodiment, freely combinable with the above, said primer comprises conductive elements e.g. conductive particles at a ratio of 0.1% to 80% (w/w) of the total dry material in said primer, for example 0.1-10% (w/w), 1-10% (w/w), 0.1-1% (w/w), 1-5% (W/W), 10-20% (W/W), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w).

According to an embodiment, freely combinable with the above, said primer comprises a polymer chosen from polyurethane, polyester, an epoxy such as polyamide, and a latex such as polyvinyl acetate latex.

If it is desired to monitor ablation and detect the end of lifespan of the topcoat, a pigment can be mixed into the primer when a tiecoat is not used, or mixed into the tiecoat, or only in the topcoat for color differentiation. Thus, according to one embodiment, said primer comprises a pigment producing a color contrasting to the color of the outermost hydrolysable layer. Conversely, the hydrolysable layer can be given a color or other detectable property which is contrasting to the underlying layer. This makes it possible to detect the end of lifespan before scale starts to accumulate.

According to an embodiment, freely combinable with the above, the coating further comprises a tiecoat between the topcoat and the substrate or between the topcoat and a primer applied to said substrate.

According to an embodiment, freely combinable with the above, said tiecoat comprises conductive elements e.g. conductive particles at a ratio of 0.1% to 80% (w/w) of the total dry material in said tiecoat, for example 0.1-10% (w/w), 1-10% (w/w), 0.1-1% (w/w), 1-5% (W/W), 10-20% (W/W), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w).

According to an embodiment, said tiecoat preferably comprises a polymer chosen from polyurethane, polyester, an epoxy such as polyamide, and a latex such as polyvinyl acetate latex.

A third aspect relates to an element having a conductive surface capable of reducing or eliminating the formation of scale on said surface when said element is used in an aqueous environment, wherein said surface comprises a hydrolysable polymer with conductive elements embedded in said polymer, wherein said conductive elements are conductive particles chosen from carbon-based materials such as graphene particles, carbon nanotubes, carbon black, graphite, activated carbon, and metal particles, said conductive particles having an average particle size in the interval from 1 nm to 500 μm.

According to an embodiment of said third aspect, said element comprises a non-conductive core.

According to an embodiment thereof, said element consists substantially of a hydrolysable polymer with conductive elements embedded in said polymer.

According to an embodiment freely combinable with the above, said element is an electrode.

A fourth aspect relates to an electrode coated with a self-polishing or ablative coating system comprising one or more layers, wherein said/each layer comprises conductive elements and wherein the outermost layer comprises a hydrolysable polymer with conductive elements embedded in said polymer.

According to an embodiment of said fourth aspect, said electrode comprises a conductive substrate such as a metallic material or graphite core which is coated with said self-polishing or ablative coating system.

According to another embodiment of said fourth aspect, said electrode comprises a non-conductive substrate which is coated with said self-polishing or ablative coating system, wherein said a non-conductive substrate is chosen from a material such as plastic, glass, or quartz.

According to an embodiment of said fourth aspect, said electrode consists substantially of a hydrolysable polymer with conductive elements embedded in said polymer, at a ratio of 0.1% to 80% (w/w) of the total dry material, for example 0.1-10% (w/w), 1-10% (w/w), 0.1-1% (w/w), 1-5% (w/w), 10-20% (w/w), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w).

It is contemplated that the ratio of conductive elements to the hydrolysable polymer is adjusted depending on the specific surface area of the conductive elements. While a material with high specific surface area can be used in small quantities, and still provide the coating with sufficient conductivity, a material with lower surface area needs to be added in proportionally larger quantities.

It is further contemplated that the conductive elements have a double function of providing conductivity and mechanically reinforcing the coating. While fibrous conductive element particles give the greatest reinforcement, also particles with other morphology will strengthen the coating, for example conductive elements shaped as platelets, flakes or spheres will have a reinforcing effect.

Importantly, the electrodes, electrical conductors or contact points can have any geometry, such as sheets, rods, plates, wires, or combinations thereof. Additionally, the surface of the electrode, electrical conductor or contact point can be smooth, roughened, curved (concave or convex), or textured in any pattern.

It is emphasized that the term “controlled degradation” is used to define for example that the coating maintains a substantially constant conductivity during its lifespan. Another definition of “controlled degradation” is that the coating degrades in a predictable fashion so that a layer of protective, conductive coating remains also at the end of the intended duration of use.

A person skilled in the art can device a test for determining the degradation behaviour of coatings, where these are tested in an aqueous environment where the temperature and flow of water/circulation is controlled and preferably constant during the test.

The rate of degradation of the coating is controlled by deliberately choosing polymers or side groups selected based on how prone to undergo hydrolysis they are, i.e. having different rates of hydrolysis when immersed in water. The rate of degradation is also controlled by adjusting the proportion of such groups. One example of such composition is silyl (meth)acrylate copolymers, optionally substituted as disclosed for example in U.S. Pat. No. 6,458,878 B1 hereby incorporated by reference.

Further, the degradation of the coating can be adapted to different temperatures, different salt content and different pH of the aqueous medium in which the coating will be used. A skilled person can turn to the literature for information on how to tailor the hydrolytic degradation properties of polymers, see e.g. L. N. Woodard and M. A. Grunlan, Hydrolytic Degradation and Erosion of Polyester Biomaterials, ACS Macro Lett., PMC 2019, Jan. 19 (doi: 10.1021/acsmacrolett.8b00424) and Domb, Abraham J., Joseph Kost, and David Wiseman, eds. Handbook of biodegradable polymers. Vol. 7. CRC press, 1998 incorporated herein by reference.

Importantly, the conductive elements are mixed with the polymer in the coating, including all layers of the coating where applicable, so that the coating remains electrically conductive during its lifetime, i.e. during the controlled degradation process. When the coating consists of only one layer, the conductive elements are evenly dispersed throughout the coating, and when the coating comprises two or more layers, conductive elements are dispersed within all layers. In the case of multiple layers, the conductive elements can be the same of different in the separate layers. Also, the concentration of conductive elements can be different in the separate layers.

Further, according to a particular embodiment, the rate of degradation can be controlled also by purposeful adjustment of the concentration or character of the conductive elements. The concentration of the conductive elements can be the same or different between the layers. The properties of the coating, such as conductivity, rate of ablation, lifespan and strength, to mention only some examples, can be tailored by incorporating different conductive elements in the different layers, and/or by varying the concentration of the conductive elements in different layers. This makes it possibly, for example, to ensure that the conductivity remains the same also when the thickness of the coating is reduced during its use.

Depending on the nature of the conductive elements, and the intended use of the coatings, the concentration of conductive elements will be in the interval of 0.1-80% per weight, preferably 0.1-30% per weight. For metal conductive elements, the concentration (weight/weight) will be higher, mainly due to the high density of the metals compared to the low density of the polymer composition. It is contemplated that for example silver would be used in concentrations of 60-70% (weight/weight). Nano carbon material having a low density can be used in correspondingly lower concentrations (weight/weight), preferably 0.1-10 wt %. Other low-density materials such as graphite can be used at concentrations of 1-30 wt %. In general, the conductive elements are included at a ratio of 0.1% to 80% (w/w) of the total dry material, for example 0.1-10% (w/w), 1-10% (w/w), 0.1-1% (w/w), 1-5% (w/w), 10-20% (w/w), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w). The weight percentage above is the ratio of conductive elements relative to the dry content in the polymer mixture or paint, forming the basis of the coating.

In one embodiment, the conductive agent comprises a combination of graphene and carbon nanotubes. The ratio of graphene to carbon nanotubes may be in the range 1:4 to 4:1, for example around 1:1. The coating is prepared by applying a solution of a hydrolysable polymer comprising 0.5-10 wt % electrically conductive agents, such as the mentioned combination of graphene and carbon nanotubes, and preferably around 2.5-5 wt % electrically conductive agents. 2.5-5 wt % of the total liquid components corresponds to about 5-10% of total dry matter when the electrically conductive agent is the mentioned combination of graphene and carbon nanotubes. The hydrolysable polymer is preferably a hydrolysable acrylate.

Very low temperatures can occur in aqueous media without said media solidifying, if the pressure is elevated, or if the media contains dissolved compounds such as salt or organic solvents. At a typical salinity, sea water freezes at −2° C., while an aqueous 10% sodium chloride solution freezes at −6° C., and a 20% solution stays liquid down to −16° C. At conditions where the concentration of salts is high, and the temperature very low, a reduced rate of degradation can result in poor anti-scaling efficacy. According to an embodiment of the invention, this is counteracted by adjusting the conductivity of the coating. If the rate of degradation becomes too slow at cold temperatures, it is possible to adjust the conductivity and/or resistance of the coating, so that the current passing through the coating results in a temperature increase, sufficient to compensate for the effect of the low temperature.

Another aspect relates to kits for preparing a self-polishing or ablative paint, said kit comprising pre-determined amounts of at least one hydrolysable polymer, a solvent, and separately therefrom, an amount of conductive elements metered to result, upon mixing with the other ingredients, in a self-polishing or ablative paint, and instructions for mixing and application of the paint. When mixed into the hydrolysable polymer, said conductive elements are present at a ratio of 0.1% to 80% (w/w) of the total dry material, for example 0.1-10% (w/w), 1-10% (w/w), 0.1-1% (w/w), 1-5% (w/w), 10-20% (w/w), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w) relative to the dry content in the polymer mixture.

Yet another aspect relates to conductive elements in particulate form, optionally mixed with anti-caking agents, weighed and pre-packed for easy mixing with at least one hydrolysable polymer and optionally a solvent to form a self-polishing or ablative paint composition wherein said conductive elements are present at a ratio of 0.1% to 80% (w/w) of the total dry material, for example 0.1-10% (w/w), 1-10% (w/w), 0.1-1% (w/w), 1-5% (W/W), 10-20% (W/W), 20-30% (w/w), 30-40% (w/w), 40-50% (w/w), 50-60% (w/w), 60-70% (w/w), 70-80% (w/w), and for example chosen from 0.1, 0.5, 1.0, 2.0, 3.0, 4.0, 5.0, 6.0, 7.0, 8.0, 9.0 and 10.0% (w/w), or 20, 30, 40, 50, 60, 70, or 80% (w/w) relative to the dry content in the polymer mixture.

The invention will now be disclosed with reference to the drawings. An electrolytic cell (1), such as schematically shown in FIG. 1, comprises a voltage source (V) and at least two electrodes (10, 20) connected to said voltage source, and immersed in an aqueous solution. Said aqueous medium can be stationary but preferably is moving, e.g. flowing past the electrodes in a continuous or semi-continuous flow, replenished during the electrolysis, or re-circulated, creating a certain movement of the solution relative to the electrodes. The electrodes, or for that matter, any conductive element exposed to an aqueous environment, are susceptible to scaling and corrosion, and the presently disclosed method aims at minimising, preventing and/or eliminating scaling, and thus also helps to prevent corrosion.

Figure 2:
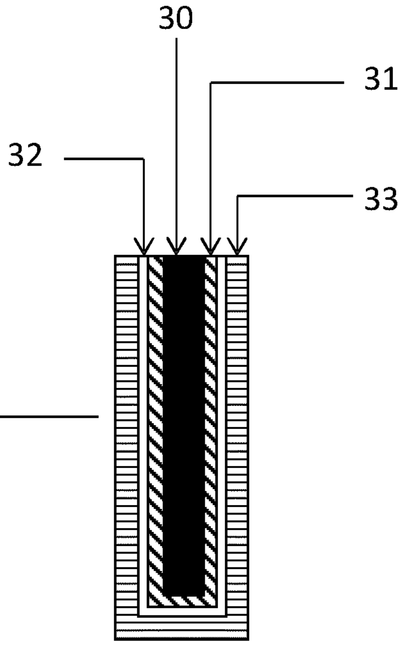
FIG. 2 schematically shows a cross section of an element such as an electrode according to an embodiment where said electrode comprises an electrode substrate or a conductive core (30), and a coating system consisting of at least one layer, here illustrated by a primer (31), a tiecoat (32), and a hydrolysable topcoat (33), each layer comprising conductive elements (not shown)

FIG. 2 schematically shows a cross section of an element such as an electrode according to an embodiment where said element/electrode comprises a substrate or core (30), and a coating system consisting of a primer (31), a tiecoat (32), and a hydrolysable topcoat (33), each layer being made conductive through the inclusion of conductive elements. While it is not shown in this schematical cross section, the coated area can be extended to the connection between the power source and the electrodes, such as the wires or cables used, the contact point between the electrode and the housing that is in contact with the electrodes, especially such portions of the equipment that are either immersed in the aqueous solution or electrolyte, in close proximity thereto, and exposed to splashes or sprays of said solution, or humid conditions.

Figure 3:
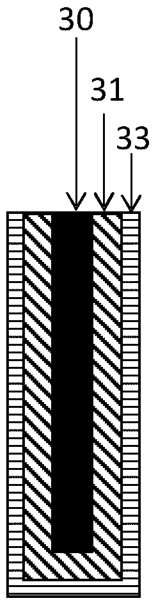
FIG. 3 schematically shows a cross section of an element such as an electrode according to an embodiment where the element/electrode comprises a substrate or core (30), and a coating system consisting of a primer (31) and a hydrolysable topcoat (33).

FIG. 3 schematically shows a cross section of an element such as an electrode according to an embodiment where the element/electrode comprises a substrate or core (30), and a coating system consisting of a primer (31) and a hydrolysable topcoat (33). The use of a primer is generally well known and understood by persons skilled in the art, but the present disclosure contributes with the feature of introducing conductive elements or conductive particles also into said primer.

Figure 4:
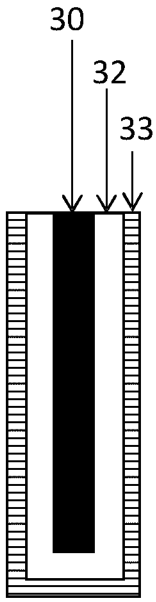
FIG. 4 schematically shows a cross section of an element such as an electrode according to an embodiment where the element/electrode comprises a substrate or core (30), and a coating system consisting of a tiecoat (32) and a hydrolysable topcoat (33).

FIG. 4 schematically shows a cross section of an element such as an electrode according to an embodiment where the element/electrode comprises a substrate or core (30), and a coating system consisting of a tiecoat (32) and a hydrolysable topcoat (33) both made conductive through the inclusion of conductive elements. A tiecoat can be used to ensure adhesion between a primer and a topcoat but depending on the chemical character of the surface to be coated and the topcoat, a tiecoat can be applied directly onto the surface to be coated. Again, the present disclosure contributes with the feature of introducing conductive elements or conductive particles also into said tiecoat.

Figure 5:
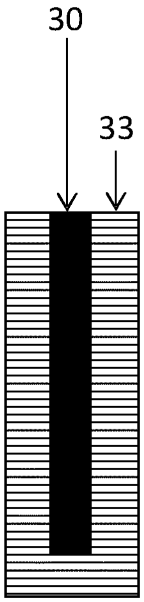
FIG. 5 schematically shows a cross section of an element such as an electrode according to an embodiment where the element/electrode comprises a substrate or core (30), and a coating system consisting of a hydrolysable topcoat (33) applied directly to the substrate.

FIG. 5 schematically shows a cross section of an element such as an electrode according to an embodiment where the element/electrode comprises a substrate or core (30), and a coating system consisting of a hydrolysable and conductive topcoat (33) applied directly to the electrode substrate. This embodiment requires that good adhesion between the electrode and the topcoat can be achieved and is dependent on the chemical character of the surface to be coated and chemical character of the topcoat.

Figure 6:
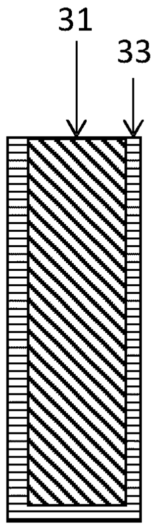
FIG. 6 schematically shows a cross section of an element such as an electrode according to an embodiment where the element/electrode comprises a core formed of one polymer mix, e.g. a primer (31) comprising conductive elements, and applied to this core (31) a layer of a hydrolysable topcoat (33) also comprising the same or different conductive elements.

FIG. 6 schematically shows an element such as an electrode where the bulk of the material is formed by a cured polymer mix made conductive by the addition of conductive elements as disclosed herein, such as a primer (31) comprising conductive elements. Said core is coated with a hydrolysable polymer mix forming a coating (33) made conductive by the addition of conductive elements as disclosed herein.

Figure 7:
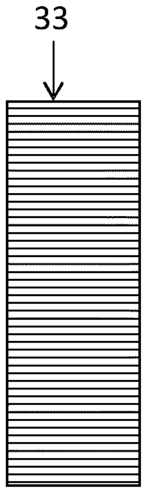
FIG. 7 schematically shows a cross section of an element such as an electrode according to an embodiment where the element/electrode consists substantially of a hydrolysable polymer e.g. a topcoat (31) comprising conductive elements moulded to a desired shape.

FIG. 7 schematically shows an element such as an electrode which consists substantially of the self-polishing or ablative composition (33). Such an element/electrode can be given various shapes (here schematically shown only) and it has the advantage of maintaining its self-polishing properties and anti-scaling effect throughout its lifespan.

The coating system disclosed herein effectively prevents scaling, as the hydrolysable polymer will slowly erode, exposing fresh surface and conductive particles, and thus prevents the build-up of scale. This is referred to as an ablative or self-polishing effect, and sometimes also referred to as sloughing. The coating system also prevents corrosion and delays erosion of the electrode or the base material, as direct contact with the corrosive aqueous environment, e.g. between an element such as an electrode and an electrolyte, is avoided.

Figure 8:
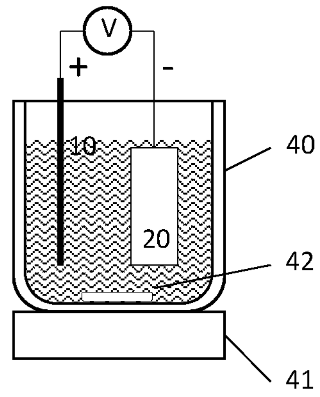
FIG. 8 illustrates the experimental cell used in Examples 1 through 3, comprising two electrodes (10, 20) connected to a power source (V) and suspended in an aqueous liquid in a container (40) equipped with a magnetic stirrer (41, 42).
Figure 10:
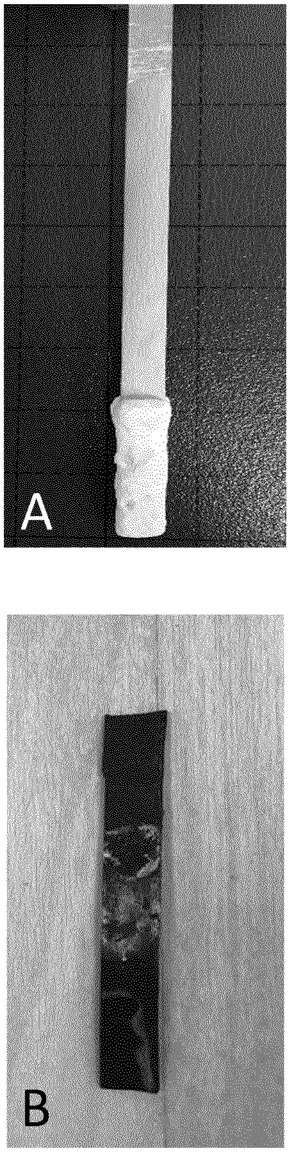
FIG. 10 shows two photographs, where panel A shows an uncoated steel electrode with a thick layer of scale formed during 28 days in seawater (Example 1) and panel B shows an electrode according to an embodiment of the invention (Example 2), with only a slight tendency to scaling, and only on surfaces where the hydrolysable topcoat has worn off during the experiment.

These effects were tested in laboratory experiments as disclosed below, and as illustrated in FIG. 8, showing a set-up comprising two electrodes (10, 20), a voltage source (V), a container (40) equipped with a magnetic stirrer (41, 42). The effect is evidenced inter alia by the results shown in FIG. 10, where scaling formed on a metal electrode is compared to the absence of scaling on an electrode prepared as disclosed herein.

When applied to an electrode, the coating system disclosed herein will result in an extended service life, and improved performance, as the electrode is not only protected from scaling, the reduced or even eliminated scaling issue results in a stable performance of the electrode, minimizes corrosion, minimizes the need for maintenance such as the mechanical removal of scale or the exchange of electrodes. The usual remedy against scaling, the periodical reversal of polarity, can entirely be avoided. As a bonus effect, the anti-scaling action will also prevent fouling, that is the build-up of organic deposits on the surface, even without the use of biocides in the coating.

By replacing or reducing the volume of the metal core, the use of conductive polymer materials will also reduce the cost and the weight of the constructions, for example the cost and weight of an element such as an electrode to be used in electrolysis or generation of H2. Proper distribution of the current is controlled by adjusting the conductivity of the coating or coatings, for example by incorporating a higher amount of conductive elements in the inner layers of the electrode. The use of several coatings with different conductivity will influence the distribution of current and can be used to guide the current along the outer surface of a coated object, or through a conductive core along the shortest path to the surface.

Figure 11:
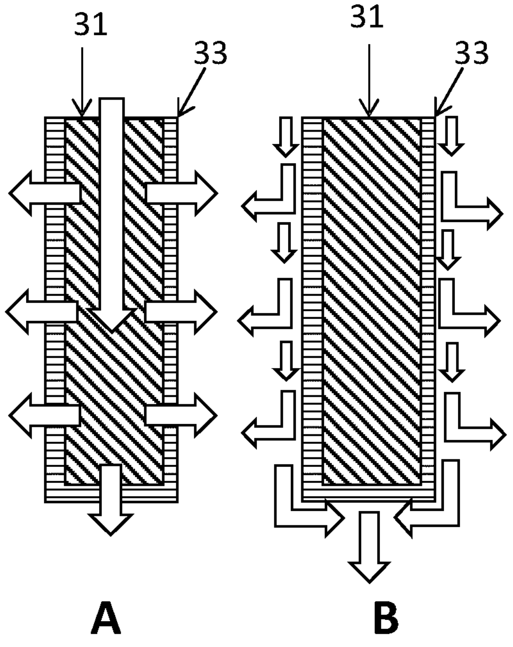
FIGS. 11 A and B illustrate how the use of coatings having different conductivity can control the path the current takes. In A, the conductive polymer core made for example of a conductive primer (31) has a higher conductivity than the conductive hydrolysable coating or topcoat (33) resulting in the current taking the shortest path through the core. Conversely, in B, the topcoat (33) has a higher conductivity than the core, and the current follows the surface of the coated object.

An example of this is shown in FIG. 11, where A illustrates an embodiment where the core (31) has been given a higher conductivity for example by including a higher ratio of conductive elements, or by including different, more conductive elements, than present in the outer, conductive hydrolysable coating (33). Here it is schematically illustrated how the current takes the shortest path through the electrode. Conversely, in B, the hydrolysable coating (33) has been given a higher conductivity than the core (33) and consequently, the current follows the surface of the element/electrode. This principle of layers of different conductivity can be applied also to multiple layers, thus controlling the distribution of current in a coated object.

EXAMPLES

Example 1. Comparative Example Using Uncoated Steel Electrodes

Cathodes were prepared by cutting a stainless-steel sheet with a thickness of 0.5 mm, into pieces of 0.5×2 cm. Platinum wire was used as the counter electrode/anode. A test cell was arranged as shown in FIG. 8. The anode 10 and cathode 20 were arranged in a beaker 40 filled with 400 ml seawater (collected at Tanager, Norway) at room temperature (20° C.). The beaker was placed on a magnetic stirrer 41 with a Teflon®-coated magnetic bar 42 rotating at 50*o* rpm. The seawater was replaced every 24 hours.

Figure 9:
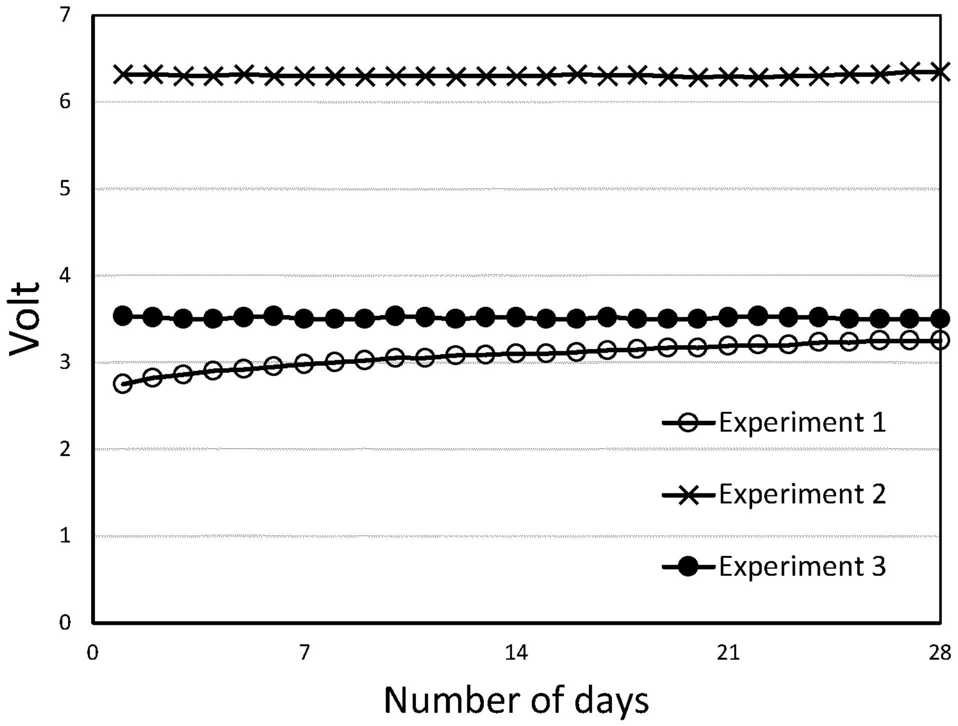
FIG. 9 is a graph showing the power output tracking for Examples 1, 2 and 3 at a constant current 0.003 A. The number of days is indicated on the x-axis, and the voltage is indicated on the y-axis.

The cathode and anode where connected to a power source supplying a constant current of 0.003 A (1.5 mA/cm$^2$). Bubbles were generated on both electrodes, cathode and anode, continuously. The total duration of the test was 4 weeks. The changing voltage was recorded, and the results are shown in FIG. 9. It was seen that the voltage increased rapidly during the first week and slowly increased during the following 3 weeks. A marked change of appearance of the electrodes was observed. A white solid material (scale) was visible already within the first week and continued forming and accumulating on the cathode steel surface during the course of the 4-week test. See FIG. 10 A.

Example 2. Coated Non-Conductive Support 0.5 cm wide test strips were cut from a 1 mm thick PVC sheet and coated with a commercial primer, here a two-component polyamine cured pure epoxy coating (Penguard Universal, Jotun Group, Norway) to a thickness of approximately 100 μm on average. Before coating, the primer was made conductive by addition of 10 wt % carbon black (Imerys Graphite and Carbon, Switzerland) and a conductivity of 0.5 S/m was measured by applying a 4-point probe to multiple locations on the coated sheet.

Onto the cured primer, a hydrolysable topcoat comprising a silyl acrylate was applied to a thickness of 10 μm on average. The hydrolysable topcoat was made conductive by addition of 8 wt % carbon nanotubes (Purity: >96%, Outside Diameter: 28-48 nm, Nanografi Nanotechnology, Jena, Germany) and a conductivity of 0.9 S/m was measured by applying a 4-point probe as above. The weight percentage is the ratio of conductive elements relative to the dry content in the paint.

The test strips were immersed in 400 ml seawater as described for Example 1. The section immersed in seawater was 0.5 cm (width)×2 cm (length). Platinum wires were used as counter electrodes/anodes, connected to a power source supplying a constant current of 0.003 A (1.5 mA/cm2). Bubbles were continuously formed on both electrodes, cathode and anode. The total duration of the test was 4 weeks. The changing voltage was recorded, and the result is shown in FIG. 9.

After 14 days, there was no visible scale on the coated electrode. When the experiment was terminated at 28 days, there was no visible scale on the left bottom part of the electrode, while a slight build-up of scale is visible on areas of the electrode where the topcoat has worn away as a result of hydrolysis and the circulating water. See FIG. 10 B.

Example 3. Coated Stainless-Steel Electrodes

A stainless-steel sheet was cut into pieces of 0.5×2 cm. Platinum wire was used as the counter electrode/anode, and the experiment conducted in a test cell as shown in FIG. 8. The stainless-steel electrodes were coated with a commercial primer (Jotun Penguard Universal, Jotun Group, Norway) to a thickness of 100 μm on average, a tiecoat (Jotun Safeguard Universal ES, Jotun Group, Norway) to a thickness of 100 μm on average, and finally a topcoat of a hydrolysable polymer was applied to a thickness of 50 μm on average. The primer and tiecoat were made conductive by an addition of 10 wt. % carbon black followed by thorough mixing. When cured, the primer and tiecoat each exhibited a conductivity of 0.5 S/m.

The topcoat was prepared by mixing 4 wt. % carbon nanotubes (Nanografi Nanotechnology, Jena, Germany) and 4 wt. % graphene (Forza B200, CealTech AS, Stavanger, Norway) with a hydrolysable polymer. The cured topcoat exhibited a conductivity of 1.1 S/m. The weight percentage above is the ratio of conductive elements relative to the dry content in the paint.

The coated electrodes were placed in 400 ml seawater from Tanager in a beaker with magnetic bar stirring at 500 rpm and kept at a temperature of 20° C. The seawater was replaced every 24 hours. connected to a power source supplying a constant current of 0.003 A (1.5 mA/cm$^2$). Bubbles were continuously formed on both electrodes, cathode and anode. The total duration of the test was 4 weeks. The changing voltage was recorded, and the result shown in FIG. 9.

Example 4. Self-Supporting Polymer Electrodes

An electrode was made by casting a 1 mm layer of a commercial primer (Jotun Penguard Universal) made conductive by the addition of 10 wt. % carbon black (Imerys). When cured, this conductive polymer core exhibited a conductivity of 0.5 S/m. The conductive polymer core was then coated with a hydrolysable polymer topcoat to a thickness of 100 μm. Before applying the topcoat, the hydrolysable polymer was made conductive by adding 8 wt. % carbon nanotubes (Nanografi Nanotechnology). The cured topcoat exhibited a conductivity of 0.9 S/m. The resulting self-supporting polymer electrode was flexible and could be bent at least 10 degrees without breaking.

Example 5. Coating Comprising Carbon Nanotubes

In another experiment, a conductive hydrolysable coating composition was prepared by adding 10% (weight/weight)

carbon nanotubes (Purity: >96%, Outside Diameter: 28-48 nm, Nanografi Nanotechnology) to a silyl acrylate polymer-based paint and mixing until the nanotubes were evenly dispersed. The resulting thixotropic composition was applied to glass substrates which were then dried in a vacuum oven at 60° C. for 4 h. The thickness of the dry cured coating was determined to be 80 μm on average, and the conductivity was measured by applying a 4-point probe to multiple locations on the coated glass. A conductivity of 1 S/m was recorded.

The coated glass samples were then immersed in a beaker containing tap water at room temperature, approx. 20° C. A magnetic stirrer at the bottom of the beaker was operated at 500 rpm to induce relative movement of water over the coated substrate. Samples were removed after 2 and 4 weeks, dried as disclosed above, and the thickness of the coating and the conductivity was measured.

The conductivity remained the same, 1 S/m, throughout the experiment, while the thickness was reduced by 2-3 μm after 2 weeks, and 5-6 μm after 4 weeks. The results indicate the degradation process is controlled and substantially linear, and that the conductivity of the coating remains stable also during degradation of the hydrolysable coating.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for preventing and/or eliminating build-up of scale on a conductive surface in contact with an aqueous environment, comprising coating said surface with a self-polishing or ablative coating system comprising one or more layers, wherein the outermost layer comprises a hydrolysable polymer with conductive elements embedded in said polymer, wherein said conductive elements comprise conductive particles chosen from carbon-based materials and combinations thereof, said conductive particles having an average particle size in the interval from 1 nm to 500 μm, and wherein said hydrolysable polymer in said coating degrades at a controlled rate through hydrolysis in contact with water while the coating maintains a substantially constant conductivity during its desired lifespan, thereby preventing and/or eliminating the build-up of scale on the conductive surface.

2. The method according to claim 1, wherein at least two layers are present, and each layer is made conductive by embedded conductive elements.

3. The method according to claim 1, wherein said conductive elements comprise a mixture of graphene particles and carbon nanotubes.

4. The method according to claim 1, wherein said conductive elements are formed from conductive polymers mixed with the hydrolysable polymer.

5. The method of claim 4, wherein the conductive polymers are selected from polythiophene, polyaniline, and polypyrrole.

6. The method according to claim 1, wherein the hydrolysable polymer is chosen from polyacrylates, polyesters, polyethers, polyamides, polyanhydrides, polyurethanes, polycarbonates, and polyureas.

7. The method according to claim 1, wherein the ratio of conductive elements to the hydrolysable polymer is in the interval of 0.1% to 80% (w/w) of the total dry material of the coating system.

8. The method of claim 1, wherein the carbon based materials are selected from graphene particles, carbon nanotubes, carbon black, graphite, activated carbon, and combinations thereof.

9. A self-polishing or ablative coating comprising one or more layers, at least the outermost layer comprising a hydrolysable polymer with conductive elements embedded in said polymer, wherein said conductive elements are conductive particles chosen from carbon-based materials, said conductive particles having an average particle size in the interval from 1 nm to 500 μm, wherein said hydrolysable polymer in said coating degrades at a controlled rate through hydrolysis in contact with water while the coating maintains a substantially constant conductivity during its desired lifespan.

10. The coating according to claim 9, wherein at least two layers are present, and each layer comprises embedded conductive elements.

11. The coating according to claim 9, wherein said conductive elements comprise a mixture of graphene particles and carbon nanotubes.

12. The coating according to claim 9, wherein said conductive elements are formed from conductive polymers, mixed or bonded with the hydrolysable polymer.

13. The coating according to claim 9, wherein the hydrolysable polymer is chosen from polyacrylates, polyesters, polyethers, polyamides, polyanhydrides, polyurethanes, polycarbonates, and polyureas.

14. The coating according to claim 9, wherein the ratio of conductive elements to the hydrolysable polymer is in the interval of 0.1% to 80% (w/w) of the total dry material of the coating system.

15. The coating according to claim 9, further comprising a primer applied on a conductive surface to be coated, improving adherence between said surface and the following coating or coatings.

16. The coating according to claim 9, further comprising a tiecoat between the topcoat and the substrate or between the topcoat and a primer applied to said substrate.

17. An element having a conductive surface capable of reducing or eliminating the formation of scale on said surface when said element is used in an aqueous environment, said surface comprising a hydrolysable polymer with conductive elements embedded in said polymer, wherein said conductive elements are conductive particles chosen from carbon-based materials, said conductive particles having an average particle size in the interval from 1 nm to 500 μm, wherein said hydrolysable polymer degrades at a controlled rate through hydrolysis in contact with water.

18. The element according to claim 17, wherein said element comprises a non-conductive core.

19. The element according to claim 17, wherein said element consists substantially of a hydrolysable polymer with conductive elements embedded in said polymer.

20. The element according to claim 17, wherein said element is an electrode.

21. An electrode coated with a self-polishing or ablative coating system comprising one or more layers, said/each layer comprising conductive elements, wherein the outermost layer comprises a hydrolysable polymer with conductive elements embedded in said polymer, wherein said hydrolysable polymer degrades at a controlled rate through hydrolysis in contact with water.

22. The electrode according to claim 21, comprising a conductive substrate coasted with said self-polishing or ablative coating system.

23. The electrode according to claim 21, comprising a non-conductive substrate which is coated with said self-polishing or ablative coating system, wherein said a non-conductive substrate is chosen from a material such as plastic, glass, or quartz.

24. The electrode according to claim 21, consisting substantially of a hydrolysable polymer with conductive elements embedded in said polymer.

* * * * *